Dec. 6, 1938.    H. P. HANSEN    2,139,546
STEERING KNOB FOR AUTOMOBILE STEERING WHEELS
Filed Oct. 25, 1937
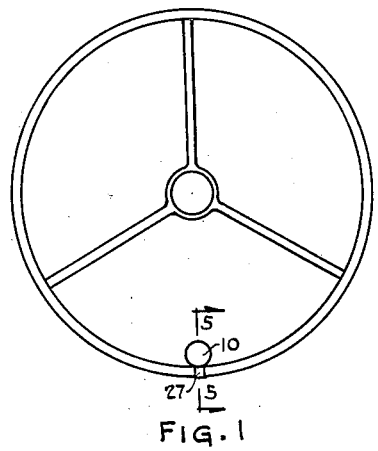
FIG. 1
FIG. 2 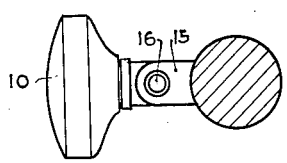   FIG. 3 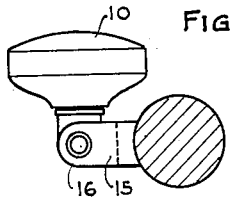   FIG. 4 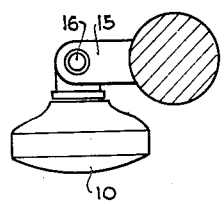
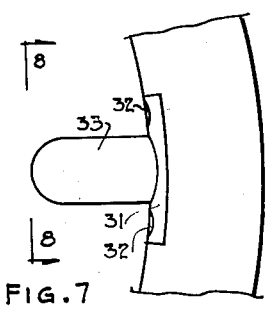
FIG. 7
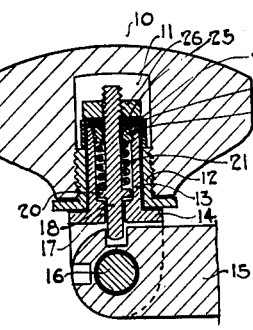
FIG. 5
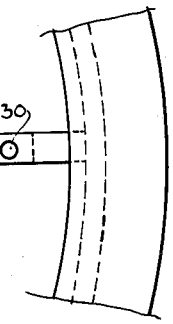
FIG. 9
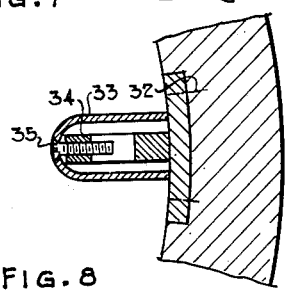
FIG. 8
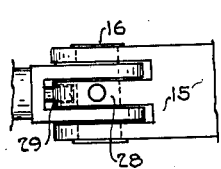
FIG. 6
INVENTOR.
HANS. P. HANSEN.
BY  Peter M. Boesen
ATTORNEY.

Patented Dec. 6, 1938

2,139,546

UNITED STATES PATENT OFFICE 2,139,546

STEERING KNOB FOR AUTOMOBILE STEERING WHEELS

Hans P. Hansen, Yonkers, N. Y.

Application October 25, 1937, Serial No. 170,753

7 Claims. (Cl. 74—557)

This invention relates to new and useful improvements in steering facilities of an automobile, and it has more particularly for its object to provide means associated with the steering wheel of a car, whereby safer and more comfortable driving may be accomplished, as the said device will prevent any slip of the hands, and any groping relative to the operation of the steering wheel, introducing at the same time the feature and element of rest and relaxation into the otherwise quite often strenuous pursuit of driving a car.

Incidentally, my device will also serve as a guide, or indicator as to the exact position of the front wheels of a car, after the latter has been placed near the curb, or in parked position, and will be especially useful in backing up a car, or placing the same in position along the curb.

My device as shown herein will also eliminate the possibility of catching the sleeve of the driver of the car, when operating the steering wheel with my device thereon, as the said device, if desired, may be put into a relatively inoperative, or inactive position, due to the special construction of the same.

With the above and other objects in view, this invention consists of the novel features of construction, combination, and arrangement of parts, hereinafter fully described, claimed and illustrated in the accompanying drawing forming part of this specification, and in which similar characters of reference indicate corresponding parts in all views, and in which:

Figure 1 is a top plan view, showing my device attached to an automobile steering wheel.

Figures 2, 3 and 4 are side elevational views, showing the different positions of said steering knob, with respect to the steering wheel.

Figure 5 is a transverse sectional view on the line 5—5 in Figure 1.

Figure 6 is a detail elevational view, illustrating the manner of securing the knob proper to its base.

Figure 7 is an elevational view of a modification of my device, adapted, however, to cooperate with the latter, as shown in Figure 1, and attached to the steering wheel.

Figure 8 is a horizontal sectional view on the line 8—8 in Figure 7; while

Figure 9 is a side elevational view of the base of my device, forming an integral part with the steering wheel proper.

Referring more particularly to the drawing, 10 indicates a steering knob, made of any suitable material, and adapted to adjustably assume three independent positions, relative to an automobile steering wheel to which latter said knob is attached.

The knob, which is made with a bore 11 therein, is mounted upon a cylindrical unit. Said unit comprises a tubular sleeve 12 threaded into said bore; this sleeve 12 is in turn adapted to slide upon an inner cylindrical tube 13, which terminates below in apertured lug members 14 adapted to be turnably attached to the base 15, and secured to the latter by means of a screw 16, as shown especially in the Figures 5 and 6. The tube 13 is closed at its bottom, except for an opening 17 therein. A plunger 18 is arranged in said inner tube 13 and adapted to extend or project below the bottom of the latter through the opening 17. The plunger has mounted thereon a spring 21, which rests its lower end upon a seat 20 formed upon the lower end of said plunger.

In order to obtain the sufficient spring action of this device, a disk member 22 is screwed into the upper part of the tube 13; said disk is formed with a central opening 23 therein, of a diameter large enough to permit the plunger 18 to move freely therein; said disk member 22 will naturally restrict the upward movement of the spring 21, when the latter is compressed during an upward movement of the plunger, as when a pull is exerted upon the knob 10. A flanged disk 24 is loosely mounted upon the upper part of the tube 13, said disk 24 is also formed with a central opening large enough to permit the plunger to move freely therein. Above said flanged disk 24 a washer 25 and nut 26 are threaded upon the upper end of the plunger 18, whereby to secure said flanged disk 24 and sleeve 12 in relative position with respect to the cylindrical tube 13, thus completing said unit in order to obtain the spring action desired.

It may be noted that instead of the employment of the upper washer and nut, a similar effect could be obtained by the use of a suitable cotter-pin made to engage the plunger.

The base may consist of a single lug, as shown in Figure 9; or the top of the base may be divided into several lug members arranged in a forked manner, as shown in Figure 6. Said base may be attached to the steering wheel by means of a ring member 27, as shown in Figure 1, or the base may be formed integral with the ring or base proper of the steering wheel, as shown in Figure 9.

The base shown in Figure 9, and the center lug, or fork-member 28 of the base shown in Figure 6, are each provided with two orifices therein, one 29 in the end thereof and one 30 in the side thereof. Said orifices are adapted to receive the lower end of the plunger 18 therein according to the adjusted position of the knob member, as shown in the Figures 2 and 3.

It will clearly appear that the position of the knob member is adjusted by pulling the knob away from its base, whereby the plunger 18 is withdrawn, or disengaged from one of the orifices 29 or 30, respectively, whereas if it is desired to eliminate the use of the knob member, the latter is simply turned downward, as shown in Figure 4.

In Figure 7 has been shown a slight modification of my device. In this view the base, which is substantially similar to the base shown in Figure 9, is secured to the steering wheel by means of a horizontally positioned metal strip 31, integral with the said base-lug and screwed on to steering wheel by means of the screws 32.

In said Figure 7, the knob member 10, hereinbefore described, has been omitted, whereas a hood member 33 has been mounted upon the base lug 34, as shown in Figure 8; a screw 35 inserted at the end of said hood member securing the latter to its basic support.

As the basic support, or lug member is of the same construction, whether the hood member 33, or the knob member 10 is secured thereto, it is evident that, if desired, one may any time remove the hood member and substitute the latter with the knob member, or vice versa.

It is obvious that changes may be made in the form, construction and arrangement of the several parts, as shown, within the scope of the appended claims, without departing from the spirit of the invention, and I do not therefore wish to limit myself to the exact construction and arrangement shown and described herein.

What I claim as new and desire to secure by Letters Patent of the United States is:—

1. A steering knob for automobile steering wheels, comprising a base formed with orifices therein, a knob member hingedly secured to said base, said knob member consisting of a head, a sleeve detachably secured to the latter, a tubular member slidably disposed in said sleeve, and a spring actuated plunger mounted within the tubular member, and being adapted to engage the orifices in the base, whereby to adjust the knob to predetermined positions.

2. In a device of the class described, a base secured to an automobile steering wheel, said base being formed with orifices therein, a knob member, a sleeve detachably secured to the latter, a tubular member slidably mounted in said sleeve, said tubular member being formed with depending lugs, whereby to connect said tubular member to the base, a spring actuated plunger mounted within said tubular member, means for securing the plunger in position relative to the latter, said plunger being adapted to engage the orifices in the base, substantially as and for the purpose set forth.

3. In a device of the class described, a base secured to an automobile steering wheel, said base being formed with orifices therein, a knob member, a sleeve detachably secured to the latter, a tubular member slidably mounted in said sleeve, and means for limiting the movement of the tubular member with respect to the latter, said tubular member being formed with depending lugs, whereby to connect said tubular member to the base, a spring actuated plunger mounted within the tubular member, said plunger being adapted to engage the orifices in the base.

4. A steering knob of the class described, comprising a base formed with orifices therein, a knob member hingedly secured to said base, said knob member consisting of a top portion, a sleeve secured to the latter, a tubular member slidably disposed in said sleeve, said tubular member being formed with depending lugs, whereby to connect the former to the base, means for limiting the movement of said tubular member within the sleeve, a plunger arranged in the tubular member, and being formed with a seat upon the lower part thereof, a spring mounted upon said plunger and abutting said seat, said plunger being adapted to engage the orifices in the base in adjusting the steering knob to a desired position.

5. In a device, as claimed in claim 1, and wherein the base is attached to the steering wheel by means of a ring member.

6. In a device, as claimed in claim 1, and wherein the base it attached to the steering wheel by means of a horizontal lug forming part of said base.

7. An automobile steering knob, comprising a base formed with orifices therein, a knob member turnably attached to said base, means for securing said knob member to the base, said knob member comprising a head portion, a sleeve detachably secured to the latter, a tubular member slidable in said sleeve and formed with an opening in the bottom thereof, a spring actuated plunger mounted in said tubular member and adapted to project through the opening in the latter, means for securing the spring and plunger in proper position, means for limiting the movement of the tubular member relative to said sleeve, and further means for securing the tubular member to the base substantially as and for the purpose set forth.

HANS P. HANSEN.